Patented Jan. 15, 1946

2,392,847

UNITED STATES PATENT OFFICE 2,392,847

RUBBERLIKE POLYMERIC SUBSTANCE AND PROCESS OF PRODUCING IT

Per K. Frolich, Westfield, N. J., assignor, by mesne assignments, to Jasco, Incorporated, a corporation of Louisiana No Drawing. Application July 25, 1940, Serial No. 347,480

12 Claims. (Cl. 260—42)

This invention relates to synthetic polymers; relates particularly to olefinic polymers, and relates especially to mixtures of simple isoolefinic polymers with sulfurizable, curable interpolymers of an isoolefin and a diolefin.

It has been found possible to produce a very valuable rubber-like polymeric substance by the low temperature polymerization of mixtures of an isoolefin such as isobutylene with a diolefin such as butadiene, isoprene, pentadiene, dimethyl butadiene, and the like, by a low temperature polymerization procedure utilizing as the catalyst a solution of aluminum chloride in a low freezing solvent such as ethyl or methyl chloride or carbon disulfide at temperatures ranging from −10° C. to −100° C. or −150° C. or lower, the preferred range being from −40° C. to −100° C., the preferred ratio of reactants being from 70 parts to 99 parts of the isoolefin with 30 parts to 1 part of the diolefin. The resulting interpolymer preferably has a molecular weight between about 25,000 and 100,000 and preferably contains approximately 1% of diolefin molecules with 99% of isoolefin molecules. When so prepared, the material has the very valuable property of being curable with sulfur, especially in the presence of an organic polysulfide of the type of "Tuads" (tetramethyl thiuram disulfide) or "Butyl Zimate" (zinc dimethyl dithiocarbamate).

This material is disclosed in further detail in the copending application, Serial No. 300,336, filed October 20, 1939, by Robert M. Thomas and William J. Sparks. As is shown in the copending application, the above described material preferably has a molecular weight ranging between 15,000 to 25,000 and 80,000 to 100,000; with an iodine number preferably within the range of 1 to 40; and is a plastic, elastic material characterized by sufficient flow to fill a mold upon heating, and after heating in the presence of sulfur, it is characterized by a tensile strength ranging from 2,500 to 4,600 pounds per square inch and an elongation at break ranging from 500% to 1200%.

For various uses, it is desirable that such polymers be compounded with an inert substance of the same general character. For this purpose another synthetic polymer has been found to be especially advantageous as a compounding ingredient. This substance is polyisobutylene, which is prepared by an analogous low temperature polymerization technique from isobutylene alone. In the preparation of this simple polymer, the isobutylene is liquefied and cooled to a convenient low temperature ranging from 0° C. to approximately −100° C. or lower if desired, and treated with gaseous boron trifluoride. The resulting polymer may have a molecular weight ranging from about 1,000 to 350,000 or higher, depending largely upon the purity of the isobutylene and the lowness of the temperature at which the polymerization is conducted.

These two polymers are markedly similar in their physical characteristics, but chemically the interpolymer differs from the polyisobutylene in that it is capable of undergoing reaction with sulfur or sulfuric compounds and in so doing is "cured." The simple polyisobutylene is "rubbery" in character and has a substantial amount of elongation and elasticity. Polyisobutene polymers show the property of cold flow, and have low tensile strengths and do not return to the original form when stretched. This lack of physical strength prevents the use of the material for many purposes where its high chemical inertness would make it highly advantageous. In contract, when the interpolymers are cured with sulfur, they yield materials which have high elasticity, elongation properties comparable with rubber, and in addition the interpolymers when cured with sulfur have a definite elastic limit beyond which they do not stretch but break, and an elongation at the elastic limit ranging from about 900% to 1200%, and, therefore, they have highly desirable and advantageous physical properties. However, the higher unsaturation of the interpolymers, even when cured with sulfur leaves the material of somewhat lower chemical and physical resistance to deteriorating influences such as oxygen, ultraviolet light and similar environmental influences than is characteristic of the simple polymers of isobutylene. It has now been found that these two polymers are compatible with each other, and in admixture the advantageous features of each serve to off-set to a high degree the less advantageous features of the other. Thus a mixture of the two can be cured to have a definite elastic limit and a good tensile strength characteristic of the interpolymer, and at the same time to retain the high chemical inertness and the high resistance of the simple polymers to oxygen, ozone and ultraviolet light. In addition the mixture is highly resistant to water, acids, alkalies and salt solutions; and it is strongly resistant to electrical phenomena generally, having high insulation resistance and a good dielectric constant.

In practicing the present invention, the interpolymer and the simple polymer are mixed together in any convenient manner, such as by milling on an open roll mill, by treatment in a Banbury type mill, by kneading together, or by mixing solutions of the respective substances in a convenient solvent, and separating the mixed polymers from the solvent by evaporation of the solvent or by precipitation by means of an organic liquid such as an alcohol, ether or ketone.

The mixture of polyisobutylene and an interpolymer desirably is admixed with sulfur and a sulfurization aid, and in addition stearic acid and zinc oxide are desirable supplemental constituents. Also the mixture may be prepared with any of the usual inert pigments or fillers or both.

Thus an object of the invention is to compound together, a curable olefinic polymer, and a simple noncuring olefinic polymer together with sulfur, a sulfurization aid, appropriate pigments, fillers, etc., and heat the mixture to produce a plastic, elastic solid which is free from cold flow, has a definite elastic limit, a good tensile strength, and a high abrasion and flexure resistance as well as a high elongation. Other objects and details of the invention will be apparent from the following description.

In practicing the invention, the mixture of interpolymer and simple polymer may be prepared on the mill desirably has a range of proportions from 10 parts to 95 parts of the interpolymer with 90 parts to 5 parts of the simple polymer. The proportion of sulfur is desirably from 0.3 part to 5 or 6 parts, preferably 0.5% to 6% or 7% of the amount of the interpolymer present. The stearic acid preferably is present in the ratio of from 1 to 10 parts, with from 1 to 10 parts of zinc oxide. The curing aid or sulfurization aid is preferably present in from 0.01 to 3 parts, preferably in the ratio of 0.5% to 2% of the amount of the interpolymer. The sulfurization aid may take the form of an organic polysulfide such as "Tuads" (tetramethyl thiuram disulfide) or may be one or another of a limited number of organic sulfur compounds such as the "Butyl Zimate" abovementioned, or may be other similar substances. The chemistry of this curing reaction is to the present wholly unknown, but it appears to be markedly different in many ways from the vulcanization of rubber; and while the above identified substances are rubber accelerators, rubber accelerators as a class do not all serve as curing aids. In addition a wide range of fillers, pigments and similar substances may be added to the compound according to the present invention. For instance carbon black may be added in the ratio of from 1 part to 200 parts per 100 of mixed interpolymer and simple polymer. Similarly, clay, lithopone, barytes, ferric oxide, wood flour, cotton linters, ground cork, chrome green, chrome yellow, lead sulfide, lead carbonate and similar fillers and pigments either singly or in various mixtures may be used.

*Example 1*

A compound of the interpolymer of isobutylene and butadiene prepared as above described containing approximately 1% of the butadiene molecules with 99% of the isobutylene was mixed with a simple polymer of isobutylene according to the subjoined formula. In this mixture the interpolymer had an iodine number of approximately 6 and a molecular weight of approximately 60,000. The polyisobutylene had an iodine number below 1, and a molecular weight of approximately 125,000.

| | Parts |
|---|---|
| Isobutylene-butadiene interpolymer | 100 |
| High molecular weight polyisobutylene | 20 |
| Sulfur | 5 |
| Stearic acid | 3 |
| Zinc oxide | 5 |
| Butyl zimate (zinc dimethyl dithiocarbamate) | 2 |

This stock was compounded on an open roll mill, the interpolymer, the polyisobutylene, sulfur, stearic acid, and zinc oxide being worked briefly on the cold mill. After thorough mixing is obtained and at a time just short of the completion of the mixing, the Butyl Zimate is added and mixed in quickly. The temperature of the stock on the mill is desirably kept below 75° C., especially during the time the sulfurization aids are being mixed in, in order to avoid premature curing, and also to avoid as much as possible, the breakdown in molecular weight of the polymers.

This material was then cured, preferably in a closed mold, for a time of approximately 60 minutes at a temperature of approximately 132° C., and when so cured showed a tensile strength of 1320 pounds per square inch and an elongation of 900%. In addition it showed a good flexure resistance and a good abrasion resistance.

*Example 2*

A similar mixture was prepared according to the subjoined formula with a relatively low molecular weight polyisobutylene; the interpolymer as before having a molecular weight of approximately 60,000, the polyisobutylene having a molecular weight of approximately 15,000.

| | Parts |
|---|---|
| Isobutylene-butadiene interpolymer | 100 |
| Polyisobutylene (Vistanex polybutene LM) | 20 |
| Sulfur | 5 |
| Stearic acid | 3 |
| Zinc oxide | 5 |
| Butyl zimate (zinc dimethyl dithiocarbamate) | 2 |

This material was also cured in the manner indicated in Example 1, but at a temperature of approximately 150° C. When so cured, the material showed a tensile strength of 1810 pounds per square inch and an elongation at break of 1050%.

*Example 3*

A sample of the polyisobutylene, known by the trade-name of "Oppanol B-200" was treated in the Banbury mixer with 5% of its weight of zinc oxide and then compounded with the interpolymer of isobutylene and butadiene according to the subjoined formula.

| | Parts |
|---|---|
| Isobutylene-butadiene interpolymer | 100 |
| Oppanol B-200 (polyisobutylene) | 20 |
| Sulfur | 5 |
| Stearic acid | 3 |
| Zinc oxide | 5 |
| Butyl Zimate (zinc dimethyl dithiocarbamate) | 2 |

The materials in this formula were mixed as in Example 1, except that the zinc oxide was mixed with the polyisobutylene in a Banbury type mixer as a preliminary step, and then the remaining members of the composition combined on an open roll mill.

This material was cured for 30 minutes at 155° C., and after curing was found to have a tensile strength of 1950 pounds per square inch.

Example 4

A mixture of the interpolymer as above described with polyisobutylene, known under the trade-name of Oppanol B-200, as in Example 3 was prepared in the same way according to the subjoined formula.

| | Parts |
|---|---|
| Isobutylene-butadiene interpolymer | 100 |
| Oppanol B-200 (polyisobutylene) | 33 |
| Sulfur | 5 |
| Stearic acid | 3 |
| Zinc oxide | 5 |
| Butyl Zimate (zinc dimethyl dithiocarbamate) | 2 |

This compound was cured for 30 minutes at a temperature of 155° C. and after curing showed a tensile strength of 2360 pounds per square inch.

Example 5

A similar mixture of polyisobutylene and the interpolymer was prepared in the same manner as in Example 3 with the proportions according to the subjoined formula.

| | Parts |
|---|---|
| Isobutylene-butadiene interpolymer | 100 |
| Oppanol B-200 (polyisobutylene) | 100 |
| Sulfur | 5 |
| Stearic acid | 3 |
| Zinc oxide | 5 |
| Butyl Zimate (zinc dimethyl dithiocarbamate) | 2 |

This mixture likewise was cured for 30 minutes at 155° C., and when so cured showed a tensile strength of 1500 pounds per square inch.

All of the above mixtures thus show an elastic limit, in contrast to polyisobutylene alone, which has the property of cold flow, and does not show an elastic limit. All of these compositions show a good tensile strength, and a good elongation, and in addition they are very resistant to chemical influences generally including oxygen, ozone and oxidizing chemicals as well as alkalies, acids and salts. They are attacked somewhat by elemental chlorine and the other elemental halogens. They are resistant to temperatures up to about 200° C. or higher. They are insoluble in most of the simple oxygenated solvents, and the hydrocarbons cause the materials to swell to a degree depending somewhat on the nature of both the solvent and the cured compound.

These products are of particular value where flexibility and elastic properties are important, and they are of particular value where their high resistance to chemical influence generally is important. They are particularly valuable for insulation generally, for proofing, covering and protecting agents for fabrics including cloth, paper, felt, Cellophane and laminer materials generally. They are particularly advantageous especially in the cured form for a wide range of coating, protecting and shock absorbing uses.

Thus the invention consists of a new and useful compound of a curable olefinic interpolymer, and a non-curable simple olefinic polymer, as such, or compounded with sulfur, in which a sulfurization aid, various pigments and fillers or both may be present.

While there are above disclosed but a limited number of embodiments of the invention, it is possible to produce still other embodiments without departing from the inventive concept herein disclosed, and it is therefore desired that only such limitations be imposed upon the appended claims as are stated therein or required by the prior art.

The invention claimed is:

1. A new composition of matter comprising in combination an interpolymer of isobutylene with a diolefin having less than 7 carbon atoms, characterized by a molecular weight within the range of 25,000 to 100,000, an iodine number within the range of 1 to 40, reactivity with sulfur and the properties of plasticity and elasticity before sulfurization and the properties of tensile strength and high elongation at break after sulfurization, together with polyisobutylene having a molecular weight of at least 1000.

2. A new composition of matter comprising in combination an interpolymer of isobutylene with butadiene, the said interpolymer being characterized by a molecular weight within the range of 25,000 to 100,000, an iodine number within the range of 1 to 40, reactivity with sulfur and the properties of plasticity and elasticity before sulfurization and the properties of tensile strength and high elongation at break after sulfurization, together with polyisobutylene having a molecular weight above 1000.

3. A new composition of matter comprising in combination an interpolymer of isobutylene with pentadiene, the said interpolymer being characterized by a molecular weight within the range of 25,000 to 100,000, an iodine number within the range of 1 to 40, reactivity with sulfur and the properties of plasticity and elasticity before sulfurization and the properties of tensile strength and high elongation at break after sulfurization, together with polyisobutylene having a molecular weight above 1000.

4. A new composition of matter comprising in combination an interpolymer of isobutylene with dimethyl butadiene, the said interpolymer being characterized by a molecular weight within the range of 25,000 to 100,000, an iodine number within the range of 1 to 40, reactivity with sulfur and the properties of plasticity and elasticity before sulfurization and the properties of tensile strength and high elongation at break after sulfurization, together with polyisobutylene having a molecular weight above 1000.

5. A new composition of matter comprising in combination an interpolymer of isobutylene with a diolefin having less than 7 carbon atoms, characterized by a molecular weight within the range of 25,000 to 100,000, an iodine number within the range of 1 to 40, reactivity with sulfur and the properties of plasticity and elasticity before sulfurization and the properties of tensile strength and high elongation at break after sulfurization, together with polyisobutylene which is not curable with sulfur and has a molecular weight of at least 1000 and sulfur.

6. A new composition of matter comprising in combination an interpolymer of isobutylene with a diolefin having less than 7 carbon atoms, characterized by a molecular weight within the range of 25,000 to 100,000, an iodine number within the range of 1 to 40, reactivity with sulfur and the properties of plasticity and elasticity before sulfurization and the properties of tensile strength and high elongation at break after sulfurization, together with polyisobutylene which is not curable with sulfur and has a molecular weight of at least 1000, sulfur and a sulfurization aid.

7. A new composition of matter comprising in combination an interpolymer of isobutylene with a diolefin having less than 7 carbon atoms, characterized by a molecular weight within the range of 25,000 to 100,000, an iodine number within the range of 1 to 40, reactivity with sulfur and the properties of plasticity and elasticity before sulfurization and the properties of tensile strength and high elongation at break after sulfurization, together with polyisobutylene which is not curable with sulfur and has a molecular weight of at least 1000, sulfur, a sulfurization aid and stearic acid.

8. A new composition of matter comprising in combination an interpolymer of isobutylene with a diolefin having less than 7 carbon atoms, characterized by a molecular weight within the range of 25,000 to 100,000, an iodine number within the range of 1 to 40, reactivity with sulfur and the properties of plasticity and elasticity before sulfurization and the properties of tensile strength and high elongation at break after sulfurization, together with polyisobutylene which is not curable with sulfur and has a molecular weight of at least 1000, sulfur, a sulfurization aid, stearic acid and zinc oxide.

9. A new composition of matter comprising in combination an interpolymer of isobutylene with a diolefin having less than 7 carbon atoms, characterized by a molecular weight within the range of 25,000 to 100,000, an iodine number within the range of 1 to 40, reactivity with sulfur and the properties of plasticity and elasticity before sulfurization and the properties of tensile strength and high elongation at break after sulfurization, together with polyisobutylene, sulfur, a sulfurization aid, stearic acid, zinc oxide and an inert filler.

10. A new composition of matter comprising in combination from 5 to 90 parts of an interpolymer of isobutylene with a diolefin having less than 7 carbon atoms, characterized by a molecular weight within the range of 25,000 to 100,000, an iodine number within the range of 1 to 40, reactivity with sulfur and the properties of plasticity and elasticity before sulfurization and the properties of tensile strength and high elongation at break after sulfurization, together with from 95 parts to 10 parts of a polyisobutylene having a molecular weight of at least 1000.

11. The method of producing new rubber-like polymeric substances which comprises mixing from 5 to 90 parts of an interpolymer of isobutylene and a diolefin of less than 7 carbon atoms characterized by a molecular weight within the range of 25,000 to 100,000, an iodine number within the range of 1 to 40, reactivity with sulfur and the properties of plasticity and elasticity before sulfurization and properties of tensile strength and high elongation at break after sulfurization with from 95 to 10 parts of polyisobutylene which is not curable with sulfur and has a molecular weight of at least 1000.

12. The method of producing new rubber-like polymeric substances which comprises mixing from 5 to 90 parts of an interpolymer of isobutylene and a diolefin of less than 7 carbon atoms characterized by a molecular weight within the range of 25,000 to 100,000, an iodine number within the range of 1 to 40, reactivity with sulfur and the properties of plasticity and elasticity before sulfurization and properties of tensile strength and high elongation at break after sulfurization with from 95 to 10 parts of a polymerized isobutylene having a molecular weight of at least 1000, incorporating from about 0.1 to about 7 parts of sulfur into the mixed polymers and curing the mixture at a temperature above 100° C.

PER K. FROLICH.